United States Patent [19]

Baxter

[11] Patent Number: 4,528,005
[45] Date of Patent: Jul. 9, 1985

[54] SMOKESTACK EMISSION CONTROL APPARATUS

[76] Inventor: William J. Baxter, Box 712, Sebastian, Fla. 32958

[21] Appl. No.: 639,460

[22] Filed: Aug. 10, 1984

[51] Int. Cl.³ .............................................. B01D 19/02
[52] U.S. Cl. ....................................... 55/178; 55/228; 55/256; 55/257 C; 55/257 PP
[58] Field of Search .................... 55/89, 178, 223, 228, 55/237, 241, 242, 245, 246, 248, 255, 256, 257 C, 257 PP; 110/215; 261/17, 84, 126

[56] References Cited

U.S. PATENT DOCUMENTS

| | | | |
|---|---|---|---|
| 2,221,572 | 11/1940 | Brock et al. | 55/248 |
| 2,376,794 | 5/1945 | McCulloch | 55/178 |
| 3,045,990 | 7/1962 | Keenan | 261/126 |
| 3,407,569 | 10/1968 | Hendricks | 55/178 X |
| 3,732,075 | 5/1973 | Acaba | 55/255 X |
| 3,752,653 | 8/1973 | Weber | 261/84 X |

FOREIGN PATENT DOCUMENTS 1028900  6/1975  Canada .............................. 110/215

Primary Examiner—Charles Hart
Attorney, Agent, or Firm—William M. Hobby, III

[57] ABSTRACT

A smokestack emissions control device is mounted to a smokestack, or the like, to clean and cool the emissions from the stack. The apparatus includes a housing shaped to be mounted on top of an emission stack and has a liquid tank formed in the housing for supporting a liquid therein. The tank is mounted directly in the passageway of escaping emissions to force the emissions through the liquid. A tank baffle extends into the liquid tank and into a liquid therein to force the escaping emissions from the smokestack through the liquid. A reduced pressure chamber is located adjacent to the liquid tank to create a negative pressure on one side of the liquid in the tank to draw the smokestack emissions through the liquid. A separator is located near the base of the stack with pipes connecting the separator to the liquid bath for circulating the liquid in the liquid tank. The liquid in the bath can be specially formulated for the particular emissions from the emission stack. Anti-foaming and bubbling means are included to prevent the liquid from foaming out of the tank. The tank is lightweight and allows the entire apparatus to be placed on an existing exhaust stack.

10 Claims, 7 Drawing Figures

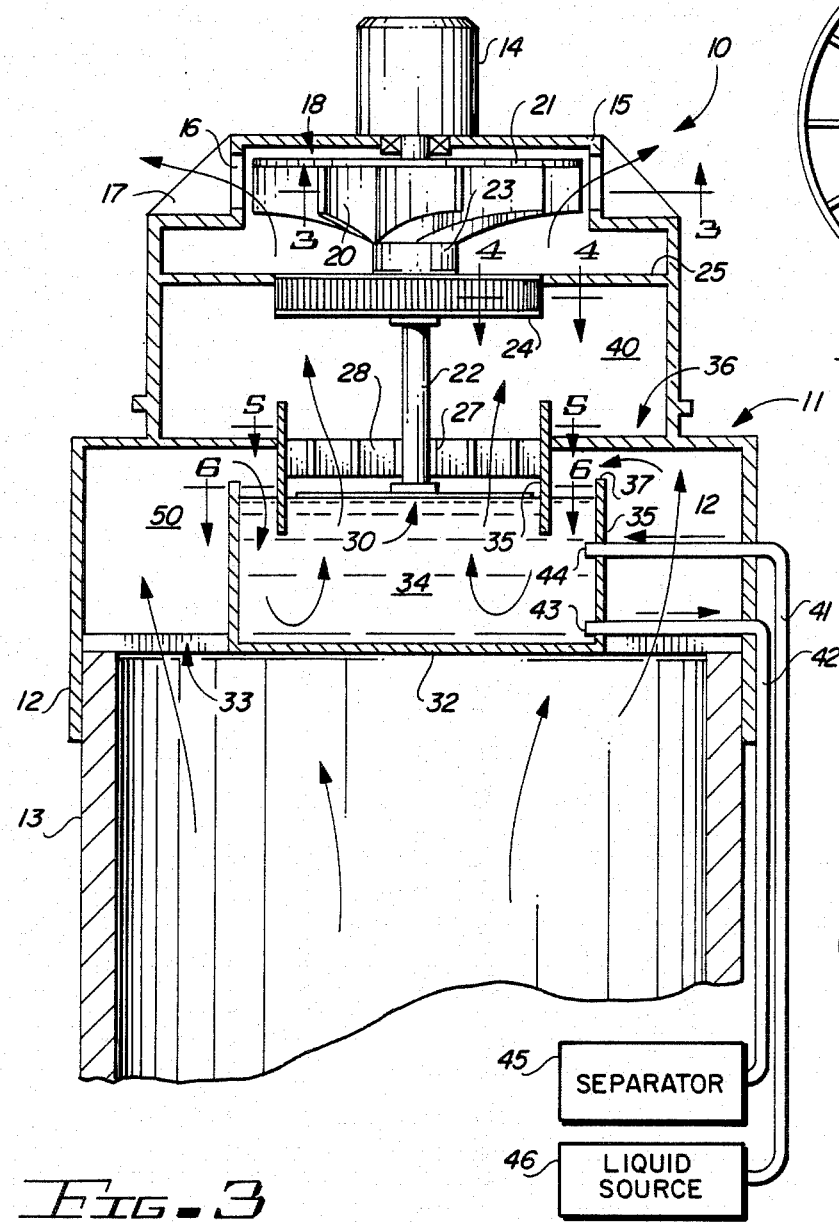
Fig.-2
Fig.-3
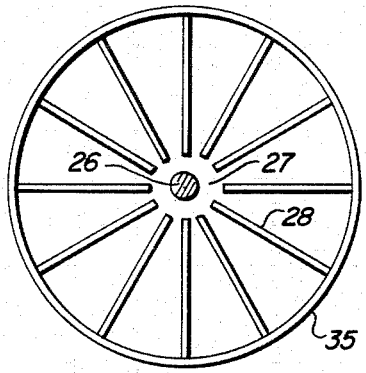
Fig.-5
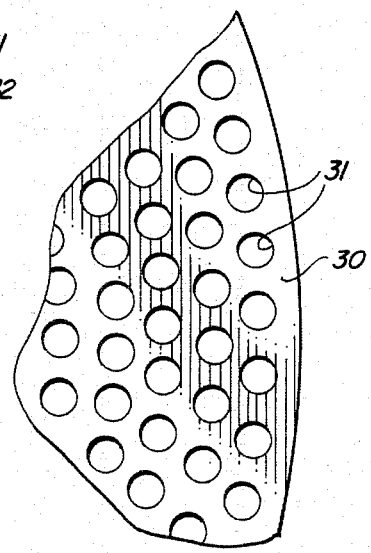
Fig.-7
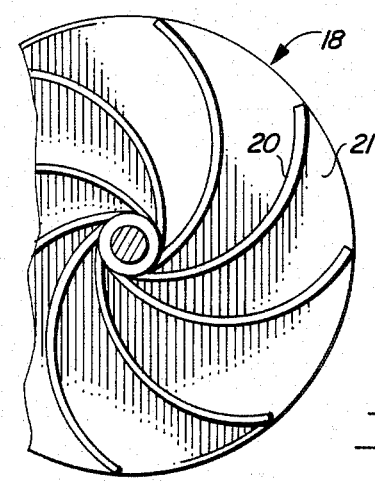
Fig.-4
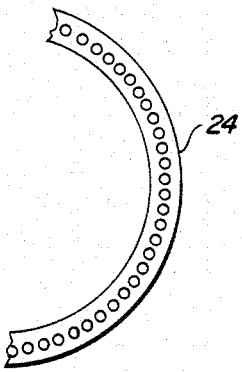
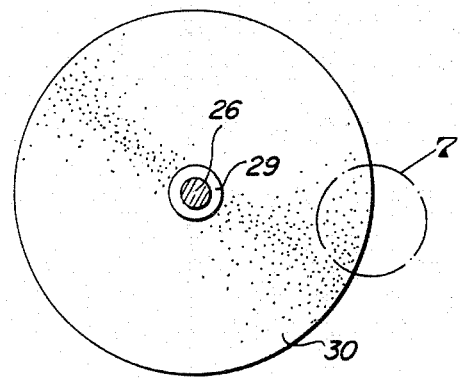
Fig.-6

SMOKESTACK EMISSION CONTROL APPARATUS

BACKGROUND OF THE INVENTION

The present invention relates to smokestack emission control devices and especially to such a device for mounting directly on top of a smokestack and forcing the emissions to pass through a liquid bath.

In the past there have been a great variety of emission control devices for use in connection with smokestacks or other emission stacks. The most common type of emission control device for smokestacks is probably scrubbers, which typically captures the emissions from the exhaust and passes it through a separate building where water is continuously sprayed from the top while the emissions enter from the bottom and pass through the sprayed water. The droplets of water capture solids in the gas and will hydrolyze components in the gas for removing harmful chemical components from the emissions. Another commonly used but more expensive technique involves electrostatic precipitation which places a charged field in or near the smokestack and passes the gases through an electrically charged screen of one polarity first and then through a second electrically charged screen of a second polarity. A charge is placed on fine solids in the gases which are then attracted to the second screen and removed from the gases. The attracted particles can be burned on the second screen or accumulated into larger particles, where they fall back into the smokestack or they can be otherwise removed from the screen.

The present invention relates to a smokestack emissions control device which is attached directly to the smokestack and which passes all of the emission gases directly through a liquid bath which can be formulated for the particular emissions. The smokestack would typically support the present invention because of its light weight. Since only a small tank of liquid is maintained in the stack while the main reservoir circulates the liquid while separating solids and chemicals from the liquid from a separator unit at the base of the stack. It has, however, in the past been taught to circulate combustion gases, and the like, directly through liquid baths, including liquid baths having other chemicals therein. In the prior Greenberg U.S. Pat. No. 3,647,358, components of the combustion gas are oxidized by passing them through a molten salt bath in one embodiment and impinging gases against the liquid surface in other embodiments. A second Greenberg patent, U.S. Pat. No. 4,173,190, uses an incinerator having a coiled tubing in a bath of molten salt and includes passing the exhaust gases through the molten salt bath. In the patent to Cremo, U.S. Pat. No. 4,257,792, a steam pressure smoke eliminator is mounted directly to tall smokestacks and is adapted to generate steam for cleaning exhaust gases. In the Pweblo patent, U.S. Pat. No. 4,437,866, a pollution harness is used for removing flue gases from the atmosphere by mixing smoke with water. The Scott patent, U.S. Pat. No. 4,231,765, discloses an air cleaning apparatus which directs air through upper and lower water curtains to act as a small scrubber in a small reservoir. Recirculating water is periodically drained and refilled. The DiProspero patent, U.S. Pat. No. 3,757,708, shows flue gases directed through a fluid tank while the Blair patent, U.S. Pat. No. 3,850,118, shows an incinerator in which the firebox is exhausted through a water tank. The aim of the present invention is to produce a lightweight smokestack emission control system which can be mounted directly onto existing smokestacks without putting undue weight on the stacks, and which can cool and remove pollutants from the exhaust gases by passing the gases and solids in the gases through a liquid bath formulated for the particular emissions and providing constant recirculation and cleaning of the liquid at a remote location.

SUMMARY OF THE INVENTION

The present invention relates to a smokestack emission control system which passes the emissions through a liquid bath mounted directly on the smokestack. The cleaner/separator and main storage of the liquid is in a separate unit at the base of the stack, which feeds a liquid tank in the stack continuously for circulating the liquid. The emission control apparatus has a housing mounted on the top of an emission stack with a generally airtight seal. The housing has a liquid tank formed therein in the stack for supporting a liquid bath. The tank is mounted in the passageway of escaping emissions so that the emissions have to pass through the liquid bath. A tank baffle extends from above the liquid in the liquid tank in to the liquid for directing the exhaust emissions around the baffle through the liquid. A reduced pressure chamber is located above the liquid tank and has a reduced pressure therein for drawing the emissions from the emission stack through the liquid bath. The cleaned exhaust gas is fed into the atmosphere. The pressure in the reduced pressure chamber is generated by an electric motor driving spiral fan or turbine blades. The electric motor is also connected to an anti-foaming plate having a plurality of apertures therein which extends to directly over the liquid bath to prevent foaming. The foaming plate is placed beneath anti-foaming baffles. A liquid separator and cleaning system is located on the ground near the smokestack, and has a pair of pipes going up the side of the emission stack into the liquid tank formed in the housing and has a pump for circulating the liquid between the separator and cleaner and the liquid tank. The liquid can be formulated for the emissions for any particular stack for not only removing fine solids from the liquid and cooling the liquid, but also for hydrolyzing acid-forming gases and for reducing other gases as required by the particular emission pollutants.

BRIEF DESCRIPTION OF THE DRAWINGS

Other objects, features and advantages of the present invention will be apparent from the written description and the drawings in which:

FIG. 2 is a sectional view taken on 2—2 of FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2;

FIG. 6 is a sectional view taken on line 6—6 of FIG. 2; and

FIG. 7 is an enlarged sectional view taken on the circle 7 of FIG. 6.

DESCRIPTION OF THE PREFERRED EMBODIMENT

Figure 1:
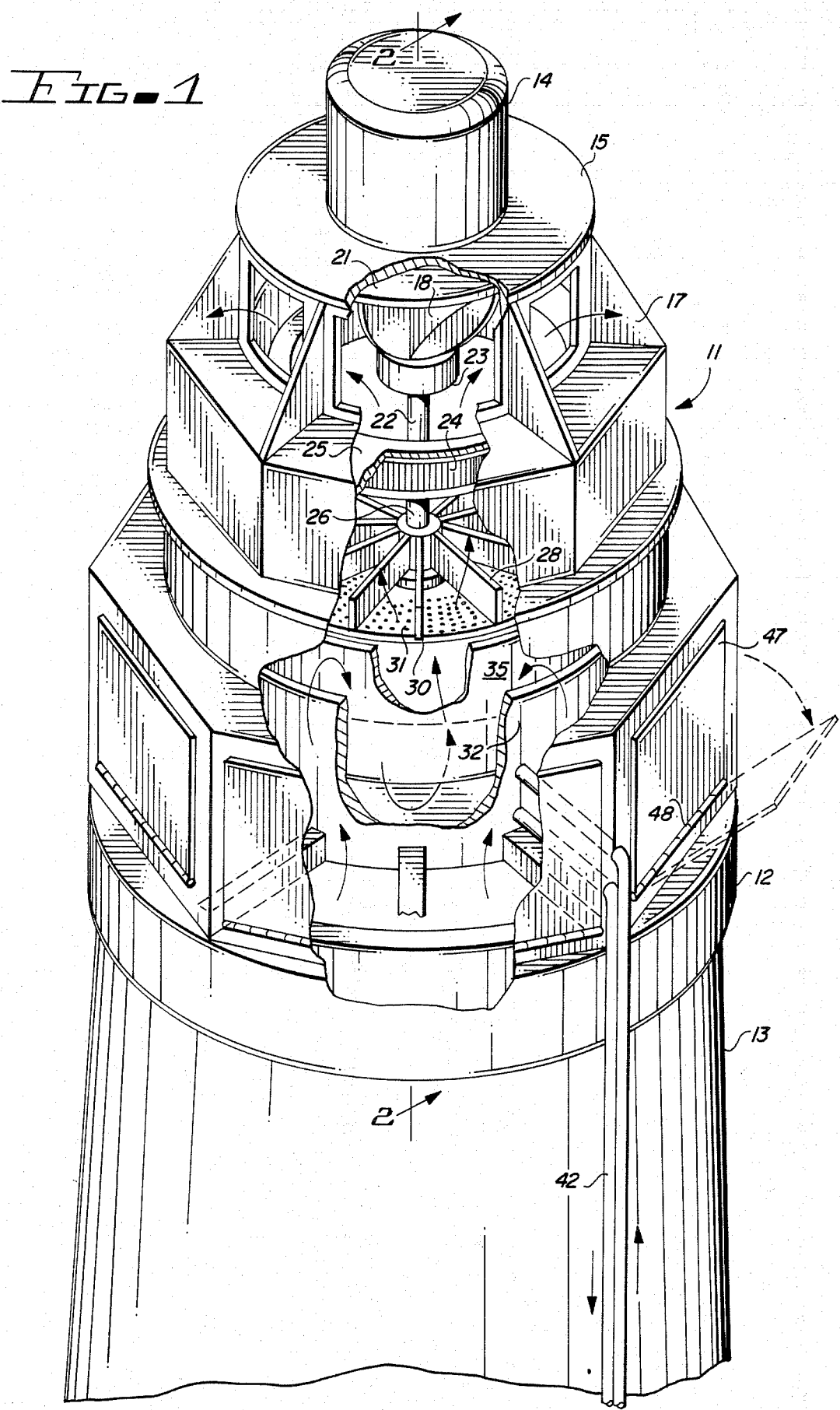
FIG. 1 is a cutaway perspective view of a smokestack emissions control apparatus mounted to the smokestack in accordance with the present invention.

Referring to the drawings, and especially to FIGS. 1 and 2, a smokestack emissions control system has a smokestack mounted unit 10 having a housing 11 formed with an annular skirt 12 for fitting over a smokestack 13. The housing has an electric motor 14 mounted to the top thereof onto a motor support plate 15 and has a plurality of exhaust ports 16 mounted between support braces 17 of the housing 11. The exhaust ports 16 are mounted adjacent to a low-noise spiral fan 18 having spiral fan blades 20 mounted to a base 21 with the electric motor shaft 22 passing therethrough. Shaft 22 is connected to a reduction gear box 23 which is attached to a dividing support plate 25 in the housing 11. The output shaft 26 from the gear box 23 is attached through a collar 27 supporting a plurality of fixed baffles 28 and anti-foaming and anti-bubble plate 30 is attached to the shaft 26 on the other side of the collar 27 for rotating at a reduced speed when driven by the electric motor 14 through the gearbox 23 and through the Divider 24.

The divider 24 rotates at a high RPM to return any particles or liquid that escapes through the anti-foaming and anti-bubble plate 30 back to the tank 34. The anti-foaming plate 30 has a plurality of apertures 31 which may be varied in size, depending upon the particular mixture of liquid used in a liquid tank 32. The liquid tank 32 is mounted with a plurality of supports 33 to the housing 11 and supports a liquid bath 34 therein which may be a mixture of water and other chemicals specifically formulated for removing specific pollutants of the particular stack 13. An annular baffle 35 extends vertically into the liquid bath 34 and is attached to the plate 36 and in turn supports the radially extending baffles 28 attached to the collar 27. The baffle 35, by extending into the liquid 34 forces the exhaust to pass around the tank 32 inside the annular skirt walls 12 around the top annular lip 37 of the tank 32 below the annular support plate 36 and into the liquid bath 34 between the annular wall and the baffle wall 35 and into a reduced pressure chamber 40. The pressure in chamber 40 is reduced by the electric motor 14 rapidly rotating the low-noise spiral fan blades 20 which produces a low-pressure area while exhausting gas out the exhaust ports 16. The reduced pressure areas needed to force the exhaust gases which are already under a slight positive pressure through the liquid bath 34, through the low-pressure chamber 40 and out the exhaust ports 16. The pressure, however, can be adjusted so that the draft within the smokestack 13 is not as important, and a shorter stack can be utilized with the system. It should be clear that while low-noise spiral fan blades 20 have been utilized, other types of blades or air pumps can be utilized without departing from the scope of the invention.

An input tube 41 and an output tube 42 extend along the side of the stack 13, pass through the housing 11 and extend into the tank 32 below the liquid level of the liquid bath 34. The outlet pipe 42 enters through an opening 43 placed near the bottom of the tank 32 for removing the liquid and settled solids from the liquid tank 32 while the input line 41 enters at 44 with a clean liquid which is used to stir up the liquid bath 34. The output line 33 is connected to a separator and cleaning unit 45 which cleans or separates the solids and other materials from the liquid which is then fed to a fluid source and pump 46. The liquid source 46 contains the cleaned liquid and has a liquid pump with it for directing the liquid through the line 41 under pressure into the liquid tank 32.

In operation the unit 10 is placed on a stack 13 and is connected through the lines 41 and 42 to the separator 45 and liquid source 46 which continuously pumps liquid into the liquid tank 32 and continuously removes liquid from the bottom of the liquid tank 32 for separation and cleaning in the unit 45. Since the separator and liquid tank 45 and 46 are fairly large, commercially available units, they cannot be placed upon the stack and must be remotely located. This, however, allows a small liquid tank 32 to be utilized which can be constantly replenished with clean fluid while removing pollutants. For instance, water wll hydrolyze gases that would otherwise generate acids and the acid can then be neutralized in the separator and cleaner 45 which can also remove accumulated solids. The liquid source 46 can provide a PH adjusted liquid to the tank 32. Operation of the electric motor 14 rotates the fan 18 for generating a negative pressure over the liquid bath 34 for drawing the gases from the stack 13 through the bath 34 and directing the gases out the exhaust ports 16. The anti-foaming plate 30 and baffles 28 prevent foaming and bubbles from foaming over the baffle wall 35.

A plurality of spring-loaded doors 47 are attached with hinges 48 to the housing 11 and connect with a passageway 50 to allow the exhausting of emissions gas in the event there is a buildup of pressure that exceeds the spring-loaded doors 47. The negative pressure generated from the reduced pressure chamber 40 by the fan 18, however, will keep these doors closed unless the system is stopped up or otherwise broken, in which case the exhaust emissions can force the doors 47 open. FIG. 3 shows a better view of the fan 18 having a base plate 21 and spiral fan blades 20.

FIG. 4 shows a portion of the divider 24.

FIG. 5 is a sectional view showing the shaft 26 passing through the collar 27 supporting the radially extending baffle numbers 28 which are in turn attached to the annular baffle wall 35.

FIG. 6 shows the shaft 26 attached with a collar 29 to the anti-foaming plate 30, while FIG. 7 has the anti-foaming plate 30 showing its large number of small apertures 31 passing therethrough. This rotating anti-foam plate 30 rotates at a slower speed than the fan 18 for breaking up bubbles and reducing the tendency to foam by a large amount of gas passing through the liquid bath 34.

It should be clear at this time that a smokestack emission control device has been shown which can easily be mounted on top of an existing smokestack and would thereby reduce the cost of directing emissions to another location for treatment. The unit can be fabricated from steel or other materials as desired in any shape desired, except that it must be formed to fit on top of a smoke or other emissions stack and must have an electrical line connecting the electrical motor and at least two lines for circulating liquid and removing accumulated pollutants to maintain the small liquid bath fresh without having to frequently change the liquid.

The system is specifically designed for modular production and easy attachment to existing stacks, or even to fireplace chimneys, and not only removes solid pollutants, but hydrolyzes gases and cools the gases that are passing through the system. The system may be installed with a crane, helicopter or even by individuals where smaller units are being mounted, and chemicals, such as detergents, can be added to the liquid for use with paper mills and salt baths with adjusted PH can be utilized with power plants. Accordingly, the present invention is not to be considered limited to the forms shown which are to be considered to be illustrative rather than restrictive.

I claim:

1. A smokestack emission control apparatus comprising in combination:
   a housing mounted on top of an emission stack;
   a liquid tank formed in said housing for supporting a liquid therein, said tank mounted in the passageway of escaping emissions from said emission stack;
   tank baffle means extending into said liquid tank into a liquid therein to force escaping emissions from said stack therethrough;
   a reduced pressure chamber located adjacent to said liquid tank in said housing for drawing said emissions through said liquid in said liquid tank;
   means to reduce the pressure in said reduced pressure chamber, said means to reduce the pressure in said reduced pressure chamber including an electric motor driving a plurality of blades mounted adjacent to an exhaust port from said housing;
   separator means located remotely from said housing for cleaning liquids passed therethrough;
   at least one pipe connecting said liquid tank and separator means for circulating liquid between said liquid tank and separator means;
   pump means for circulating liquids from said separator means through said pipes to said liquid tank in said housing;
   an anti-foam plate mounted over said liquid tank; and
   said electric motor connected to said anti-foam plate for rotating said anti-foam plate to reduce foaming in liquid in said liquid tank, whereby smokestack emissions are passed through a liquid bath for cleaning and cooling said emissions in a liquid at the opening of a smokestack.

2. Smokestack emission control system in accordance with claim 1 in which anti-foaming baffles are placed adjacent to said anti-foam plate and radially extending from a collar around the motor shaft.

3. A smokestack emission control apparatus in accordance with claim 2 in which an annular vertically extending baffle extends into said liquid tank below the normal level of liquid and is attached to said housing with a dividing wall to form a passageway between said housing and said liquid tank sidewalls and around said dividing wall and annular baffle through said liquid bath whereby emission gases are forced from said stack through said liquid baths.

4. Smokestack emission control apparatus in accordance with claim 3 in which said anti-foam plate is a flat disk having a plurality of apertures therethrough for breaking up foam and bubbles of gases passing through said foam plate apertures.

5. Smokestack emission control apparatus in accordance with claim 4 in which said separator means includes a separator and cleaning unit and a liquid storage container mounted separately from said smokestack and connected by input and output lines to said housing liquid tank.

6. A smokestack emission control apparatus in accordance with claim 5 in which said output line from said liquid tank to said separation means enters said liquid tank adjacent to the bottom thereof for removing accumulated solid pollutants from said liquid tank to said separator unit.

7. A smokestack emission control apparatus in accordance with claim 6 in which said liquid tank input line is connected between a clean liquid source and said liquid tank and is connected to the liquid tank in a position for stirring up the liquid in said liquid tank.

8. Smokestack emission control apparatus in accordance with claim 7 in which said liquid bath in said liquid tank includes water having an adjusted Ph and at least one chemical for reducing pollutants passing therethrough.

9. A smokestack emission control apparatus in accordance with claim 8 in which said housing has a base plate for resting on top of an emission smokestack and is attached to said annular skirt extending around said smokestack for supporting said unit to the top of a smokestack.

10. A smokestack emission control apparatus in accordance with claim 1 in which said housing has an annular skirt for fitting over the outside of a smokestack.

* * * * *